(12) United States Patent
Heieis et al.

(10) Patent No.: US 11,584,244 B2
(45) Date of Patent: Feb. 21, 2023

(54) RAPID CHARGING SYSTEM AND METHOD FOR ELECTRICALLY CONNECTING A VEHICLE TO A CHARGING STATION

(71) Applicant: SCHUNK TRANSIT SYSTEMS GMBH, Wettenberg (DE)

(72) Inventors: Nils Heieis, Lich (DE); Matthias Domes, Bad Nauheim (DE); Timo Staubach, Herbstein (DE); Peter Schneider, Fronhausen (DE)

(73) Assignee: SCHUNK TRANSIT SYSTEMS GMBH, Wettenberg (DE)

( * ) Notice: Subject to any disclaimer, the term of this patent is extended or adjusted under 35 U.S.C. 154(b) by 206 days.

(21) Appl. No.: 16/980,768

(22) PCT Filed: Mar. 12, 2019

(86) PCT No.: PCT/EP2019/056153
§ 371 (c)(1),
(2) Date: Sep. 14, 2020

(87) PCT Pub. No.: WO2019/175165
PCT Pub. Date: Sep. 19, 2019

(65) Prior Publication Data
US 2021/0008989 A1 Jan. 14, 2021

(30) Foreign Application Priority Data
Mar. 15, 2018 (DE) .......................... 102018106046.7

(51) Int. Cl.
*B60L 53/14* (2019.01)
*B60L 53/10* (2019.01)
(Continued)

(52) U.S. Cl.
CPC ............... *B60L 53/14* (2019.02); *B60L 53/11* (2019.02); *B60L 53/16* (2019.02); *B60L 53/35* (2019.02);
(Continued)

(58) Field of Classification Search
CPC .......... B60L 53/11; B60L 53/14; B60L 53/16; B60L 53/35; H02J 7/0045
(Continued)

(56) References Cited

U.S. PATENT DOCUMENTS

2016/0130851 A1* 5/2016 Storm .................... B60L 50/53
49/31
2016/0167532 A1 6/2016 Weigel et al.
(Continued)

FOREIGN PATENT DOCUMENTS

DE 102014226357 A1 6/2016
DE 102015219438 A1 4/2017
(Continued)

OTHER PUBLICATIONS

PCT International Search Report and Written Opinion, PCT/EP2019/056153, dated Jun. 13, 2019, 24 pages.
(Continued)

*Primary Examiner* — Edward Tso
*Assistant Examiner* — Aaron Piggush
(74) *Attorney, Agent, or Firm* — Quarles & Brady LLP (57) ABSTRACT

A fast charging system for electrically driven vehicles and a method for forming an electrically conductive connection between a vehicle and a stationary charging station, the fast charging system having a contact device, a charging contact device and a positioning device, said contact device or said charging contact device being disposeable on a vehicle, said charging contact device being electrically contacted using the contact device when in a contact position, said contact
(Continued)

device being positioned in a longitudinal and/or transverse direction with respect to the charging contact device as well as being moved to the contact position by means of the positioning device, said charging contact device comprising a charging-contact-element carrier having charging contact elements, said charging contact elements each forming a strip-shaped charging contact surface, said contact device comprising a contact element carrier having contact elements, said contact elements each forming a contact surface which is smaller than the charging contact surfaces, said contact elements being electrically contacted with the charging contact elements for forming contact pairs in each instance when in the contact position, the charging contact surfaces and the contact surfaces being disposed such in the longitudinal direction with respect to each other that a respective physical contact between the charging contact surfaces and the contact surfaces is formed in a defined order at respective longitudinal ends of the charging contact surfaces.

24 Claims, 4 Drawing Sheets

(51) Int. Cl.
*B60L 53/35* (2019.01)
*H02J 7/00* (2006.01)
*B60L 53/16* (2019.01)
(52) U.S. Cl.
CPC ............. *H02J 7/0045* (2013.01); *Y02T 10/70* (2013.01); *Y02T 10/7072* (2013.01); *Y02T 90/12* (2013.01); *Y02T 90/14* (2013.01)

(58) Field of Classification Search
USPC .......................................... 320/104, 107, 109
See application file for complete search history.

(56) References Cited

U.S. PATENT DOCUMENTS

| | | | | |
|---|---|---|---|---|
| 2016/0185239 | A1* | 6/2016 | Weigel | .................... B60L 53/16 |
| | | | | 320/109 |
| 2017/0080813 | A1* | 3/2017 | Bedell | ........................ B60L 5/18 |
| 2017/0182898 | A1* | 6/2017 | McGrath | ................. B60L 53/18 |
| 2018/0001777 | A1* | 1/2018 | Kilic | ..................... B60L 53/665 |

FOREIGN PATENT DOCUMENTS

| | | |
|---|---|---|
| DE | 202016101174 U1 | 6/2017 |
| DE | 102016103919 A1 | 9/2017 |
| DE | 102016212584 A1 | 1/2018 |
| EP | 1997668 A1 | 12/2008 |
| EP | 2284635 A1 | 2/2011 |
| EP | 3299212 A1 | 3/2018 |
| WO | 2011079215 A2 | 6/2011 |
| WO | 2012118422 A1 | 9/2012 |
| WO | 2014207537 A2 | 12/2014 |
| WO | 2017216260 A1 | 12/2017 |

OTHER PUBLICATIONS

EC Engineering, Ride&Charge—Fast Charging System for Electric Bus by EC-Engineering, https//www.youtube.com/watch?v=wFosi9fdM4c, Online Publication Date: Nov. 10, 2017, 2 pages.
Cenelec, English Version—Electric Vehicle Conductive Charging System—Part 1: General Requirements, European Standard EN 61851-1, Aug. 2011, 58 pages.

* cited by examiner

RAPID CHARGING SYSTEM AND METHOD FOR ELECTRICALLY CONNECTING A VEHICLE TO A CHARGING STATION

CROSS-REFERENCE TO RELATED APPLICATIONS

This application represents the National Stage of International Application No. PCT/EP2019/056153, filed Mar. 12, 2019, which claims priority to German Patent Application DE 10 2018 106 046.7, filed Mar. 15, 2018, which disclosures are hereby incorporated by reference for all purposes.

The disclosure relates to a fast charging system for electrically driven vehicles, in particular electric busses or the like, and a method for forming an electrically conductive connection between a vehicle and a stationary charging station, the fast charging system having a contact device, a charging contact device and a positioning device, said contact device or said charging contact device being disposable on a vehicle, said charging contact device being electrically contacted using the contact device when in a contact position, said contact device being positioned in a longitudinal and/or transverse direction with respect to the charging contact device as well as being moved to the contact position by means of the positioning device, said charging contact device comprising a charging-contact-element carrier having charging contact elements, said charging contact elements each forming a strip-shaped charging contact surface, said contact device comprising a contact element carrier having contact elements, said contact elements each forming a contact surface which is smaller than the charging contact surface, said contact elements being electrically contacted with the charging contact element for forming contact pairs in each instance when in the contact position.

Fast charging systems and methods of this kind are known from the state of the art and are typically employed for fast charging electrically driven vehicles at a bus stop or a stopping point. Electrically driven vehicles used in local transport, such as busses, can thus continuously be supplied with electrical energy at the respective bus stop.

From DE 10 2015 219 438 A1, a fast charging system is known in which a roof-shaped charging contact device is contacted by a correspondingly designed contact device. In this case, the charging contact device comprises charging contact elements which are realized in the manner of conductor strips and are disposed so as to extend in a moving direction of the vehicle. Contact elements of the contact device are formed like bolts and realize a punctiform contact with the conductor strips when in the contact position. Reaching the contact position accurately is enabled by the contact device being inserted into the charging contact device in a vertical direction, that is transverse to a moving direction of the vehicle.

However, fast charging systems known from the state of the art are disadvantageous in the sense that under unfavorable conditions, an electric arc may occur between a contact element and a charging contact element at a longitudinal end of a charging contact element during a charging process. In particular in accordance with a load of the electric bus, the electric bus can be positioned higher or lower with respect to the charging contact device or contact device when stopping. Even when lowering the electric bus on the passenger side in order to aid passengers to embark, the contact device or the contact elements are displaced with respect to the charging contact device so that an electric contact can also be interrupted. However, this displacement can be compensated by, for example, mounting the contact device on a transverse guide which allows said displacement.

If charging contact elements having strip-shaped charging contact surfaces are used, it is also necessary to accurately position the electric bus in an intended area of the bus stop with respect to a moving direction. A position deviating from an intended position of the electric bus, for example when the strip-shaped charging contact surfaces are contacted with longitudinal ends of the charging contact elements by means of the contact elements, can prevent a safe contact or connection between the vehicle and a stationary charging station. When lowering the vehicle in or opposite to a moving direction, contact elements can be moved in or opposite to the moving direction beyond a longitudinal end of a charging contact surface, basically preventing a thus far not initiated charging process from being started or an already initiated charging process from being interrupted. Interrupting a contact pair in this manner may cause electric arcs, which pose a considerable risk. Furthermore, it is also possible that the contact element carrier is contacted with the strip-shaped charging contact surfaces or that said contact pairing is interrupted by something as simple as a movement of the vehicle in or opposite to a moving direction, for example when arriving at or leaving the bus stop. Consequently, contact pairs can be contacted or interrupted unintentionally which can damage components of the fast charging system or persons standing nearby.

The object of the present disclosure is therefore to propose a fast charging system and a method for forming an electrically conductive connection between a vehicle and a charging station, which enables an inexpensive operation of the means of transport and safe contacting.

This object is attained by a fast charging system having the features of claim 1 and a method having the features of claim 22.

The fast charging system for electrically driven vehicles according to the disclosure, in particular electric busses or the like, for forming an electrically conductive connection between a vehicle and a stationary charging station comprises a contact device, a charging contact device and a positioning device, said contact device or said charging contact device being disposable on a vehicle, said charging contact device being able to be electrically contacted using the contact device when in a contact position, said contact device being able to be positioned in a longitudinal and/or transverse direction with respect to the charging contact device as well as be moved to the contact position by means of the positioning device, said charging contact device comprising a charging-contact-element carrier having charging contact elements, said charging contact elements each forming a strip-shaped charging contact surface, said contact device comprising a contact element carrier having contact elements, said contact elements each forming a contact surface which is smaller than the charging contact surfaces, said contact elements being able to be electrically contacted with the charging contact elements for forming contact pairs in each instance when in the contact position, the charging contact surfaces and the contact surfaces being disposed such in the longitudinal direction with respect to each other that a respective physical contact between the charging contact surfaces and the contact surfaces can be formed in a defined order at respective longitudinal ends of the charging contact surfaces.

By disposing the charging contact surfaces relative to the respectively associated contact surfaces in the longitudinal direction of the strip-shaped charging contact surfaces, a defined order for forming and disconnecting contact pairs with respect to the longitudinal direction can be realized. In this case, the longitudinal direction refers to the direction in which the strip-shaped charging contact surfaces essentially extend. As this can be a moving direction of a vehicle, the longitudinal direction essentially corresponds to a horizontal direction when the charging-contact-element carrier is positioned horizontally. However, the charging-contact-element carrier can also be positioned parallel to a traveled way on which a vehicle is driving and which can also be inclined relative to a horizontal line. The transverse direction refers to a vertical direction which extends transversely or orthogonally relative to the strip-shaped charging contact surfaces.

When guiding the contact device and the charging contact device together in a vertical and/or horizontal direction, a first contact pair can initially be formed before forming an additional contact pair by means of the defined order for forming the contact pairs. With the devices known from the state of the art, contact pairs can also be formed at different times, though this would be unintended or not occur as a result of the position of the charging contact surfaces and contact surfaces. By disposing the contact elements on the contact element carrier and the charging contact elements on the charging-contact-element carrier, it is therefore ensured that the order in which contact pairs are formed when guiding the contact element carrier and the charging-contact-element carrier together, in particular in the longitudinal direction, is inevitably always adhered to and also cannot be changed easily because of the geometric position of the contact surfaces and charging contact surfaces; the position of the contact surfaces and the charging contact surfaces therefore prescribes the order in which contact pairs are formed during a relative movement in the longitudinal direction. This applies to guiding together and separating the contact element carrier and the the charging-contact-element carrier in the longitudinal direction. This ensures in particular that an electric arc or an unwanted contact is prevented when guiding the respective contact surfaces together with the charging contact surfaces and also when separating them, which can, for instance, also occur unintentionally when the vehicle is tilted. This preventive measure can be carried out by only transmitting high currents when specific contact pairs are formed. Protective-ground contacts or signal contacts can then, for instance, be formed before contact pairs are formed, or the position in question can ensure that power contacts are currentless when the power contacts are disconnected because of the position of said power contacts. Possible damage to the fast charging system or possible endangerment of persons can be prevented in this manner without great effort.

Thus, the contact pairs can each be formed for power contacts, a signal contact and a protective-ground contact of the fast charging system. In this case, at least two contact pairs of power contacts are to necessary for transmitting a charging current between the contact device and the charging contact device. The charging current can be a direct current or an alternating current. Additional contact pairs for transmitting the charging current can be provided in order to be able to transmit high currents via the respective contact surfaces over a short period of time. Furthermore, a large number of contact pairs ensures that even if a single contact pair is interrupted, a charging current is still able to flow. The protective-ground contact can serve for connecting the vehicle with mass or a zero potential. The signal contact can serve for exchanging signals and data between the vehicle and the fast charging system or a charging station. In particular, it can be envisaged that a current does not flow via the contact pairs of the power contacts until the contact pair for the signal contact and the protective-ground contact has been formed. Vice versa, a charging current which flows via the contact pairs of the power contacts can be switched off directly if the signal contact and/or the protective-ground contact is interrupted. Thus, it can be ensured that an unintentional displacement of a contact element on a charging contact surface first leads to the signal contact being disconnected before a contact pair of a power contact is disconnected. This ensures that the power contact is always currentless if the signal contact and/or the protective-ground contact are/is disconnected.

Furthermore, the charging contact surfaces and/or the contact surfaces can be disposed such in the longitudinal direction with respect to each other that first the protective-ground contact, then the power contacts and then the signal contact can be formed. This applies to producing an electrical contact by positioning the contact device and the charging contact device in the contact position, and vice versa for their disconnection due to the fact that first the signal contact, then the power contacts and then the protective-ground contact are disconnected. It should be noted that the position of the charging contact surfaces and/or to the contact surfaces is formed correspondingly in the longitudinal direction at the respective longitudinal ends of the charging contact surfaces in each instance. It can thus be ensured that when the contact device and the charging contact device are guided together in the longitudinal direction or moving direction of a vehicle, first, a safe contact and then, upon separation, a safe disconnection are possible.

The longitudinal ends of the charging contact surface for forming the protective-ground contact can each protrude beyond the longitudinal ends of the remaining charging contact surfaces in the longitudinal direction. This ensures in any case that the contact pair for the protective-ground contact is the first to be formed when guiding the contact device and charging contact device together or that the contact pair for the protective-ground contact is the last to be formed when disconnecting the contact device and charging contact device, whereby a higher electrical safety can be achieved.

The longitudinal ends of the charging contact surface for forming the power contact can each protrude beyond the longitudinal ends of the charging contact surface for forming the signal contact in the longitudinal direction. This further ensures that when guiding the contact device and the charging contact device together, the contact pair of the signal contact is not formed until after the contact pairs for the power contacts have been produced or that when disconnecting the contact device and the charging contact device, the contact pair of the signal contact is disconnected before the contact pairs for the power contacts have been disconnected. When a closed signal contact causes a current to be applied to the respective contact pairs of the power contacts, it is always ensured that the power contacts are only exposed to a current if a signal contact is truly realized. Since an unintentional displacement of the contact elements of the contact pairs of the power contacts, for instance when a vehicle is tilted in the longitudinal direction or in the moving direction, also leads to the contact elements of the contact pair of the signal contact becoming displaced as a result, it is then ensured that the signal contact is opened or disconnected before the power contact is disconnected. Electric arcs can safely be prevented in this manner.

The charging contact surface for forming the protective-ground contact can be longer than the charging contact surface for forming the power contact, said charging contact surface for forming the power contact being able to be longer than the charging contact surface for forming the signal contact. In particular when guiding together and separating the contact device and the charging contact device, a defined order for producing contact pairs can be safely adhered to.

Alternatively, the charging contact surfaces and/or the contact surfaces can be disposed such in the longitudinal direction with respect to each other that the protective-ground contact and a power contact or the signal contact and a power contact can be formed first. In this case, when the protective-ground contact or the signal contact is not formed, a charging process via the power contact can also be prevented, for instance by switching off the current from the power contact, thus preventing an electric arc.

The charging contact elements can be realized as conductor strips, said conductor strips being able to be disposed parallel to each other and in the direction of a longitudinal axis of the charging-contact-element carrier. In particular, the conductor strips can then be disposed in the longitudinal direction or in a horizontal direction which essentially corresponds to a moving direction of the vehicle. For instance, the conductor strips can be over 1 m long so that a vehicle can stop in one area at a bus stop. Thus, the charging contact elements can form a comparatively large contactable surface for the contacting elements. A conductor strip can consequently also be easily produced, for example by using a semi-finished product as a conductor strip.

The contact elements can be disposed in at least one plane which can extend orthogonally to the longitudinal axis when in the contact position. This then ensures that the contact elements can simultaneously be inserted into or extracted from the charging-contact-element carrier in the longitudinal direction or the moving direction. An offset different from the orthogonal position of the plane can arise because of a positioning error of the vehicle at the bus stop, in which case it might occur that achieving the contact position by means of the shape of the contact device and the charging contact device is not possible or that achieving the contact position is only possible within a small angular tolerance.

The contact elements can be disposed in an additional plane which extends orthogonally to the longitudinal axis when in the contact position, the planes being able to be distanced from each other in the direction of the longitudinal axis, contact elements for forming power contacts each being able to be disposed in the plane and the additional plane. It can be envisaged to dispose the contact elements at an offset relative to each other in the direction of the longitudinal axis or a moving direction of the vehicle at the contact element carrier in order to also obtain a desired position relative to the longitudinal ends of the charging contact surfaces for achieving a defined order during a contact or disconnection by means of said position.

The contact elements can be formed in the shape of bolts. Furthermore, the contact elements can be spring-mounted on the contact element carrier. The contacting elements can thus be produced particularly easily, the spring-mounting being effected via a simple pressure spring within or at the contact element. Consequently, a punctiform contact with a charging contact element can be realized in a spring-loaded manner. Furthermore, it can also be envisaged that a plurality of contact elements, meaning several contact pairs, is provided, for instance for a contact pair for a power contact. Preferably, two contact elements can be envisaged for a phase or a power contact each.

As a result, the contact surface can also be punctiform. This can in particular be the case when bolt-shaped contact elements are used. Generally, however, it is also possible to realize other forms of contact surfaces, depending on the shape of the contact elements. It is essential, however, that the respective contact surface is always smaller than the smallest charging contact surface or smaller than the charging contact surface which is the shortest in the longitudinal direction.

The contact device and the charging contact device can each comprise a vertical axis, said respective vertical axes being able to align flush when in the contact position. The vertical axes can extend vertically with respect to a traveled way so as to be able to guide the contact device and the charging contact device together in a vertical direction. Generally, it is also possible for the contact device and the charging contact device to also be guided together in a horizontal direction in addition. This can depend in particular on whether a vehicle is being moved when guiding together or separating the contact device and the charging contact device.

Furthermore, a guiding device can position the respective vertical axes in a shared alignment when guiding the contact device and the charging contact device together. This means that if the vertical axes of the contact device and the charging contact device are not flush with respect to each other, the physical contact consequently cannot be realized. Only when the guiding device has positioned or oriented the contact device and the charging contact device with respect to the each other so that the respective vertical axes are aligned flush or are positioned in a shared flush alignment, can the physical contact be realized.

It is therefore advantageous for the fast charging system to comprise a guiding device for guiding the contact device or the charging contact device to the contact position, the guiding device being able to be realized such that when guiding the contact device and the charging contact device together, a physical contact between the contact elements and the charging contact elements is prevented before the contact position is reached. When guiding the contact device and the charging contact device together, the physical contact between the contacting elements and the charging contact device is consequently prevented from even being possible by the guiding device before the contact position is reached. The physical contact can then only be formed or produced when the contact position has been reached. The contact elements cannot slide along the charging contact device or its surfaces over larger distances, whereby an undesired abrasion of the contact elements or the surface of the charging contact device is avoided.

The contact device can be disposed on a vehicle roof and the charging contact device can be disposed on a stationary charging station or vice versa. In this context, the vehicle roof can be a vehicle roof of an electric bus or of a trolley car, for example. For this purpose, it can also be intended, for example, to position the contact device or the charging contact device on the vehicle roof in such a manner that the contact device or the charging contact device is arranged on a driver's side of the vehicle roof in moving direction. Positioning the contact device or the charging contact device is thus immensely facilitated for a driver of the vehicle since this contact device or charging contact device or rather its position is in the driver's line of vision.

The charging-contact-element carrier can form a receiving opening for the contact element carrier, said contact element carrier being able to be inserted into the receiving opening of the charging-contact-element carrier. Preferably, the receiving opening can be formed in a V-shape for this purpose. The V-shape of the receiving opening causes the contact element carrier or the charging-contact-element carrier to be centered when guiding the contact device and the charging contact device towards the receiving opening at a relative deviation of the contact element carrier. Vice versa, the contact element carrier can form a receiving opening for the charging-contact-element carrier, said charging-contact-element carrier being able to be inserted into the receiving opening of the contact element carrier. Preferably, the receiving opening can also be formed in a V shape for this purpose, the contact elements being able to be arranged within the V-shaped receiving opening.

The receiving opening can form a guide for the contact element carrier or the charging-contact-element carrier when guiding the contact element carrier and the charging-contact-element carrier together. Possible deviations in the position of the vehicle from an intended stopping position when stopping at a bus stop can thus be easily compensated by the guiding of the contact element carrier or the charging-contact-element carrier to the contact position caused by the receiving opening.

It is especially advantageous if the charging-contact-element carrier is formed as a longitudinal roof-shaped rail which can be disposed in a moving direction of the vehicle. The charging contact elements can then be disposed on an underside of the longitudinal roof-shaped rail so that the charging contact elements are not directly exposed to the effects of the weather. The longitudinal roof-shaped rail can also be designed so as to be comparatively long, an exact positioning of the vehicle at a bus stop no longer being necessary. The longitudinal roof-shaped rail can preferably be open at its ends so that the contact element carrier can be inserted into or extracted from the longitudinal roof-shaped rail in the moving direction as well. If the charging-contact-element carrier is to be arranged on a vehicle, the charging-contact-element carrier can be realized as a crosspiece-shaped elevation which can be disposed in a moving direction of the vehicle.

The positioning device can comprise a pantograph or a rocker by means of which the contact device can be positioned in a vertical direction with respect to the charging contact device. In the case of a rocker, a supplementary linkage can be provided which stabilizes the contact device with respect to the charging contact device or vice versa, or orients the contact device in the corresponding direction. Therefore, the contact device or the charging contact device can be disposed at the pantograph or the rocker. Furthermore, the positioning device can be disposed on a vehicle roof or, for instance, a pole of a charging station or bus stop, a bridge or an underpass. A pantograph or a rocker or, respectively, a corresponding mechanical drive can be produced particularly easily and inexpensively.

In the method according to the disclosure for forming an electrically conductive connection between a vehicle and a stationary charging station, in particular for a fast charging system for electrically driven vehicles such as electric busses or the like, the fast charging system comprises a contact device, a charging contact device and a positioning device, said charging contact device being electrically contacted using the contact device when in a contact position, said contact device being positioned in a longitudinal and/or transverse direction with respect to the charging contact device as well as being moved to the contact position by means of the positioning device, said charging contact device comprising a charging-contact-element carrier having charging contact elements, said charging contact elements each forming a strip-shaped charging contact surface, said contact device comprising a contact element carrier having contact elements, said contact elements each forming a contact surface which is smaller than the charging contact surfaces, said contact elements being electrically contacted with the charging contact elements for forming contact pairs in each instance when in the contact position, at least one charging contact surface being contacted with a contact surface at a longitudinal end of the charging contact surface, said charging contact surfaces and the contact surfaces being disposed such in the longitudinal direction with respect to each other that when guiding the charging contact surfaces and the contact surfaces together, first the protective-ground contact, then the power contacts and then the signal contact is formed. Regarding the advantages of the method according to the disclosure, the description of advantages of the fast charging system according to the disclosure is referred to.

When the charging contact surfaces and the contact surfaces are separated, first the signal contact, then the power contact and then the protective-ground contact can be disconnected.

The charging contact surfaces and the contact surfaces can be disposed such in the longitudinal direction with respect to each other that a respective physical contact between the charging contact surfaces and the contact surfaces is formed in a defined order at respective longitudinal ends of the charging contact surfaces.

Further advantageous embodiments of the method are derived from the dependent claims referring to claim 1.

In the following, preferred embodiments of the disclosure are further described with reference to the attached drawings.

Figure 1:
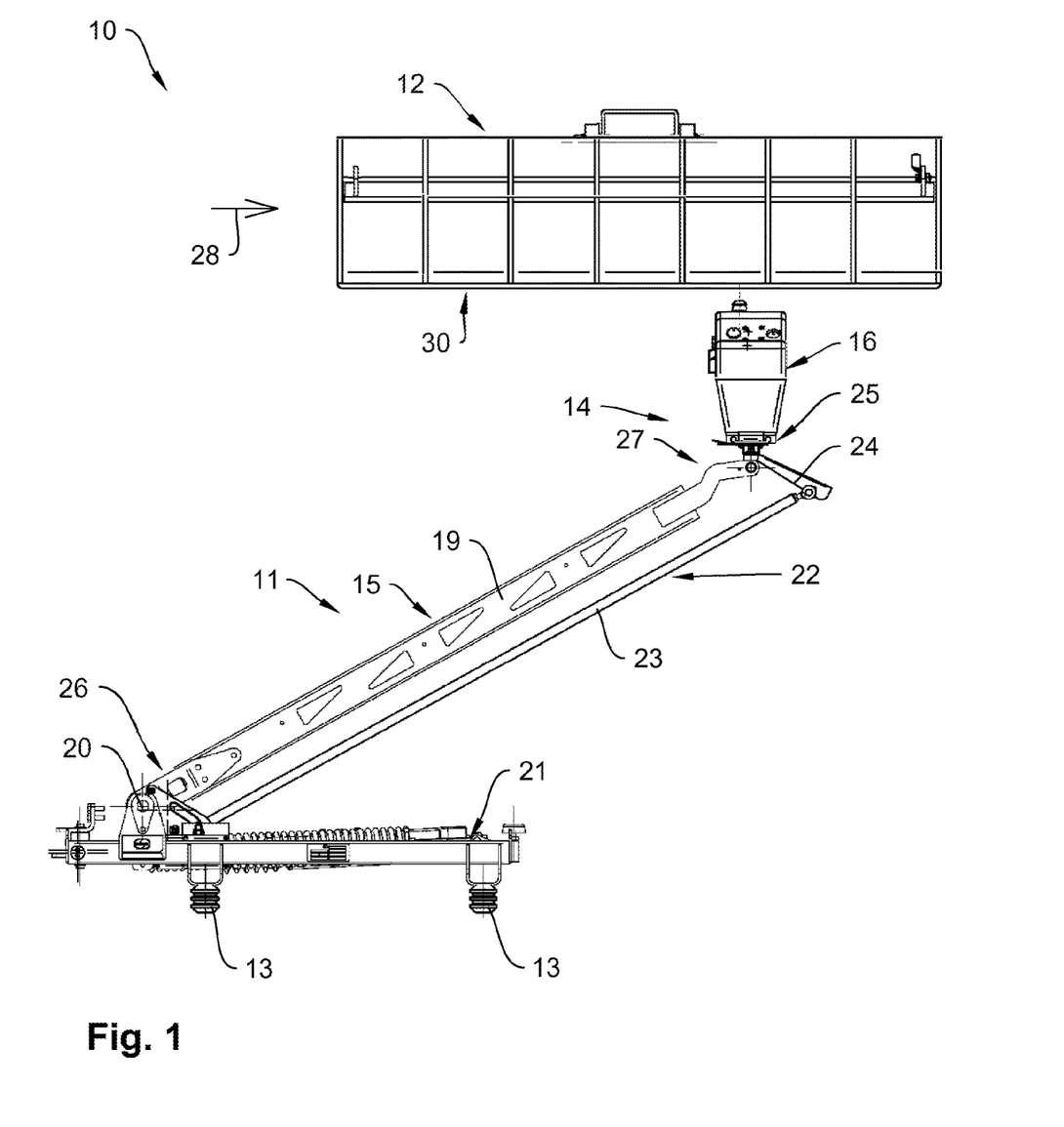
FIG. 1 illustrates an embodiment of a fast charging system in a side view.
Figure 2:
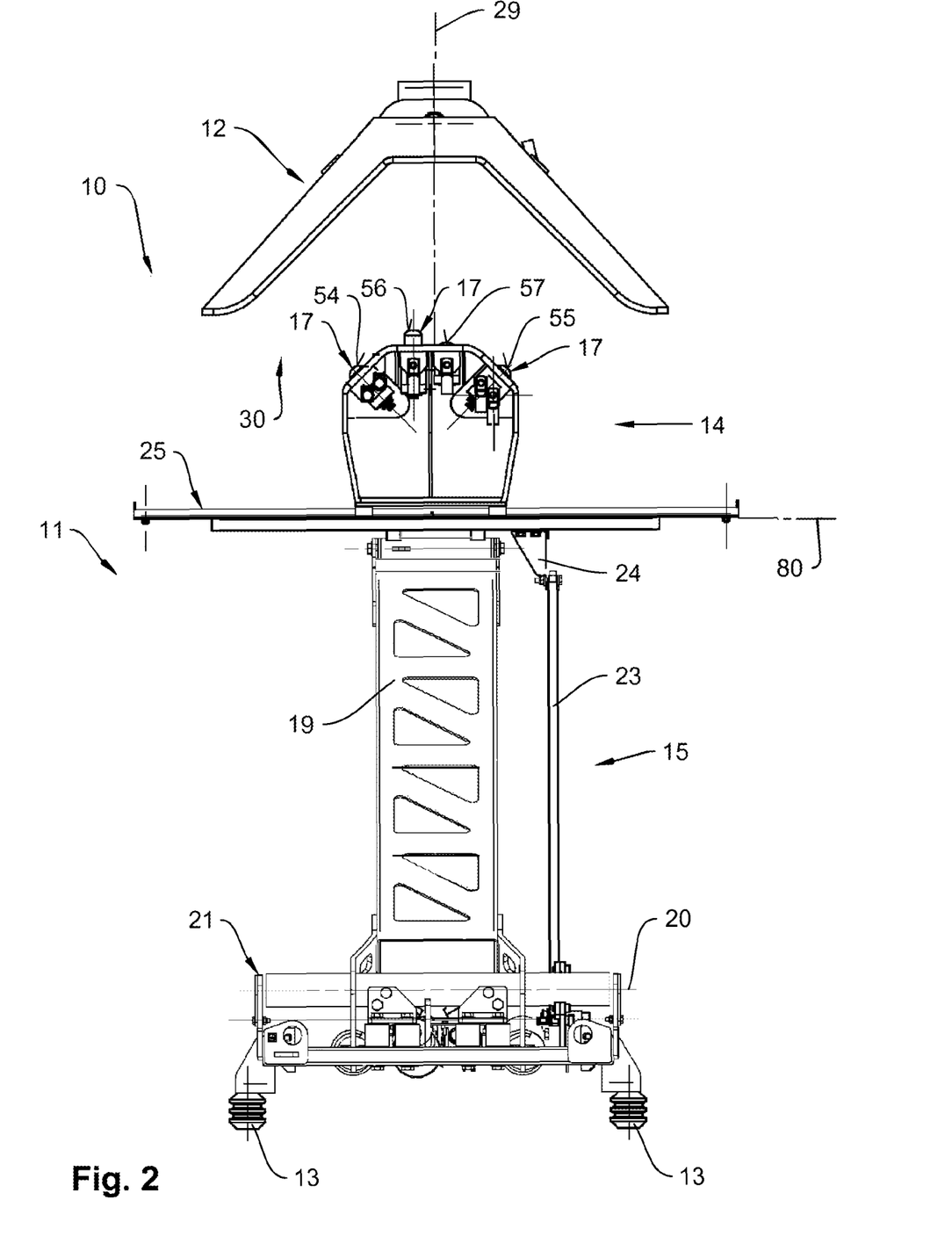
FIG. 2 illustrates the fast charging system in a front view.

A synopsis of FIGS. 1 and 2 illustrates a fast charging system 10, made up of a contact device 11 and a charging contact device 12. In the interest of simplification, a mounting device is not illustrated but may be present. The contact device 11 is attached on a roof of a vehicle or an electric bus (neither further illustrated) via electrically insulated feet 13. The charging contact device 12 is suspended above the electric bus in the area of a bus stop of the electric bus by means of a suspension device (not further illustrated). The contact device 11 comprises a contact element carrier 14 which can be contacted with the charging contact device 12 and a positioning device 15 which can position the contact element carrier 14 relative to the charging contact device 12. The contact element carrier 14 further comprises a body 16 having contact elements 17 which can be contacted with charging contact elements 18 of the charging contact device 12. In the illustrated embodiment, the positioning device 15 has a rocker 19 which can be pivoted via a pivot bearing 20 on an attachment frame 21 of the contact device 11. Furthermore, a linkage 22 of the positioning device 15 is provided, a rod 23 of the linkage 22 being connected to a lever 24 of a transverse guide 25 of the positioning device 15. When the rocker 19 is pivoted around the pivot bearing 20 at a lower end 26 of the rocker 19, to the transverse guide 25, which is disposed at an upper end 27 of the rocker 19, is constantly kept in a horizontal position via the linkage 22. Thus, the body 16 cannot become tilted relative to a horizontal plane 80 during pivoting. The contact element carrier 14 is disposed on the transverse guide 25 in a freely displaceable manner transverse to a moving direction of the vehicle, which is indicated by arrow 28. In this manner, it can be ensured that when the contact element carrier 14 and charging contact device 12 are guided together, the contact element carrier 14 can freely align itself relative to a vertical axis 29 of the charging contact device 12 if the contact element carrier 14 has not been positioned directly flush with the vertical axis 29 when the electric bus has stopped. After contact has been made with the charging contact device 12 by positioning the contact element carrier 14 in a receiving opening 30 of the charging contact device 12, the electric bus can be tilted relative to the vertical axis 29 by one-sided lowering, if needed, the contact element carrier 14 then being able to be freely displaced on the transverse guide 25 transverse to the moving direction of the electric bus. In particular, the rocker 19 is tilted at an angle (not further illustrated) relative to the vertical axis 29.

Figure 3:
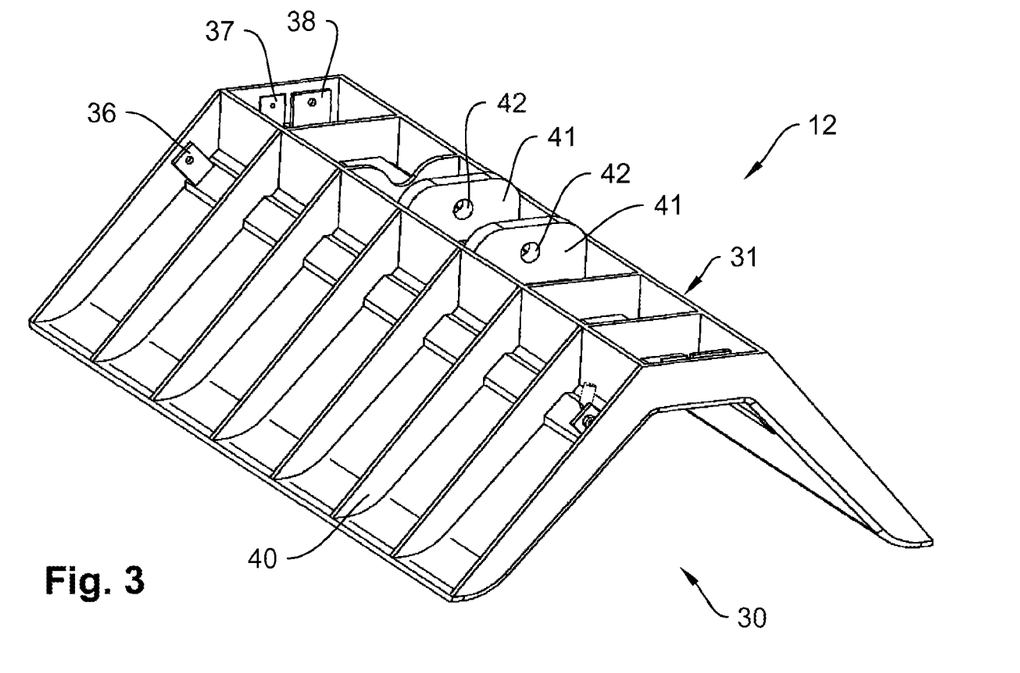
FIG. 3 illustrates a charging contact device of the fast charging system in a perspective view.
Figure 4:
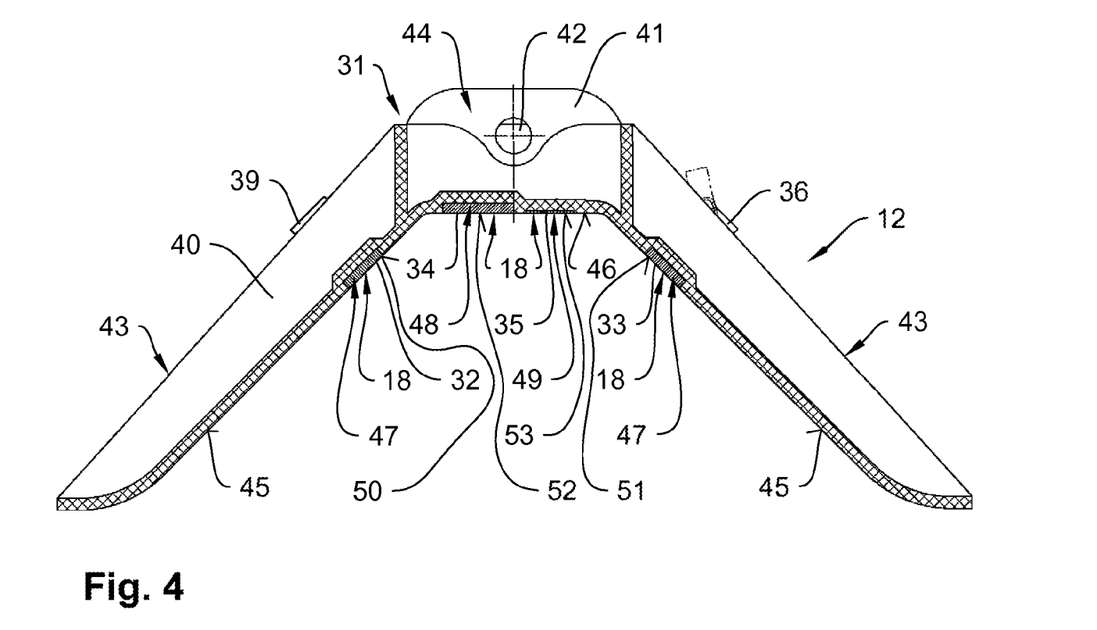
FIG. 4 illustrates the charging contact device in a cross-sectional view.

A synopsis of FIGS. 3 and 4 illustrates the charging contact device 12, which is essentially made up of a charging-contact-element carrier 31, which is made of a plastic material, and of the charging contact elements 18. The charging contact elements 18 themselves are each realized as conductor strips 32, 33, 34 and 35 and extend in the longitudinal direction of the charging-contact-element carrier 31. The conductor strips 32 and 33 serve for transmitting a charging current, said conductor strip 34 representing a protective-ground conductor and said conductor strip 35 representing a control line. Apart from this, contact lugs 36 to 39 for connecting lines (not further illustrated) are provided. The charging-contact-element carrier 31 is essentially formed in one piece and has, inter alia, reinforcement ribs 40 and attachment ribs 41 having passage openings 42 for suspending the charging-contact-element carrier 31 from a pole (not further illustrated) or the like. The receiving opening 30 is formed in a V-shape in such a manner that two symmetrical legs 43 are connected to each other via a horizontal crosspiece 44. The attachment ribs 41 form the crosspiece 44 and other elements, and the reinforcement ribs 40 form the legs 43. Within the receiving opening 30, the charging contact device 12 forms contact surfaces 45 and 46 for the contact element carrier 14. Within each of the contact surfaces 45 on the legs 43, recesses 47 are formed for receiving conductor strips 32 and 33, respectively, in a flush manner; recesses 48 and 49 for receiving conductor strips 34 and 35, respectively, in a flush manner being formed within the contact surface 46 of the crosspiece 44. In particular, the charging contact elements 18 form strip-shaped charging contact surfaces 50, 51, 52 and 53, respectively, which can be electrically contacted with contact surfaces 54, 55, 56 and 57, respectively, of the contact elements 17 for realizing a contact pair (not further illustrated) each. Furthermore, the charging contact surfaces 50, 51, 52 and 53 and the contact surfaces 54, 55, 56 and 57 are disposed in the longitudinal direction (indicated by arrow 28) relative to each other such that a respective physical contact between the charging contact surfaces 50, 51, 52 and 53, respectively, and the corresponding contact surfaces 54, 55, 56 and 57, respectively, can be formed and/or disconnected in a defined order at respective longitudinal ends of the charging contact surfaces 50, 51, 52 and 53, respectively, (not further illustrated).

Figure 5:
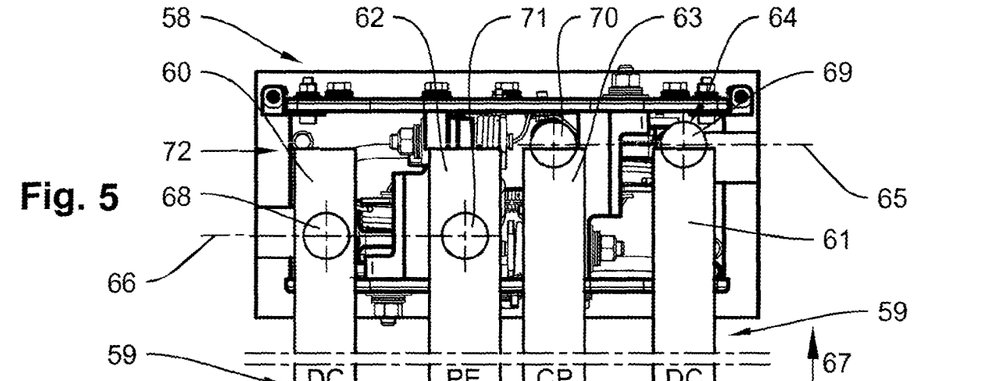
FIG. 5 illustrates a schematic top view of a contact device and a charging contact device of a fast charging system in a first contact position.
Figure 6:
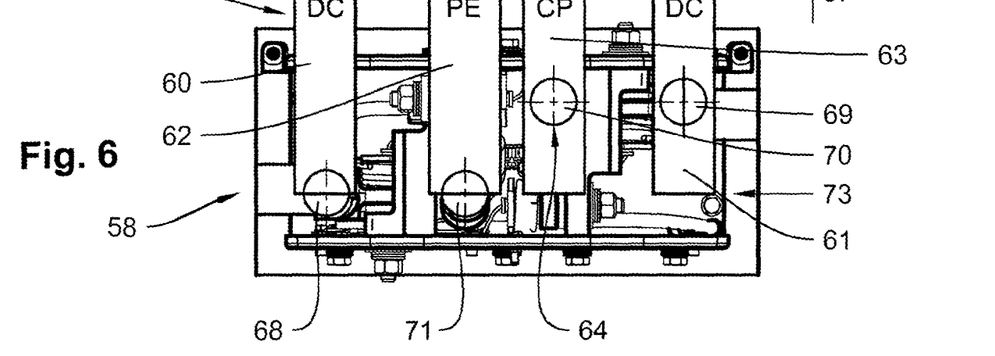
FIG. 6 illustrates a schematic top view of the contact device and the charging contact device from FIG. 5 in a second contact position.

FIGS. 5 and 6 illustrate a schematic top view of a contact device 58 and a charging contact device 59 of a fast charging system (not further illustrated). In this case, the charging contact device 59 forms four charging contact surfaces 60, 61, 62 and 63. The contact device 58 comprises a number of contact elements 64 which are disposed orthogonally in a plane 65 and in an additional plane 66 relative to a moving direction or longitudinal direction (indicated by arrow 67) of the charging contact surfaces 60, 61, 62 and 63. The plane 65 and the additional plane 66, and therefore also the respective contact elements 64, to are disposed at a distance relative to each other. The contact elements 64 each form contact surfaces 68, 69, 70 and 71 themselves. The charging contact surface 60 is contacted with the contact surface 68, and the charging contact surface 61 is contacted with the contact surface 69 for realizing a power contact each for transmitting a charging current. In this case, the charging current is a direct current. The charging contact surface 63 is contacted with the contact surface 70 for realizing a signal contact and the charging contact surface 62 is contacted with the contact surface 71 for realizing a protective-ground contact.

In FIG. 5, the contact surface 69 and 70 are shifted so far at a longitudinal end 72 of the charging contact surfaces 60, 61, 62 and 63 that the formed signal contact and power contact can be easily interrupted, which, however, cannot cause an electric arc at the power contact between the contact surface 69 and the charging contact surface 61 because the signal contact is also interrupted, which causes the charging current to be switched off. At the opposite longitudinal end 73 (illustrated in FIG. 6) of the charging contact surfaces 60, 61, 62 and 63, the contact surfaces 68 and 71 are positioned such on the charging contact surfaces 60 and 62 that an electric arc forming at the opposite longitudinal end 73 can essentially be ruled out.

Figure 7:
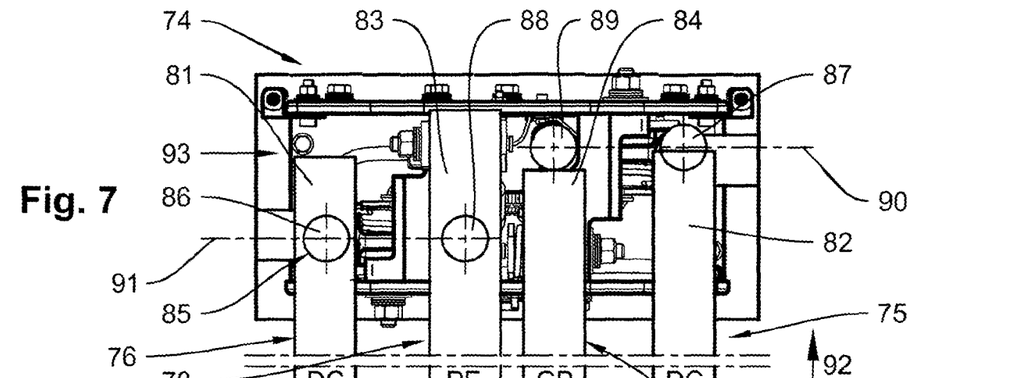
FIG. 7 illustrates a schematic top view of an additional contact device and an additional charging contact device of an additional fast charging system in a first contact position.
Figure 8:
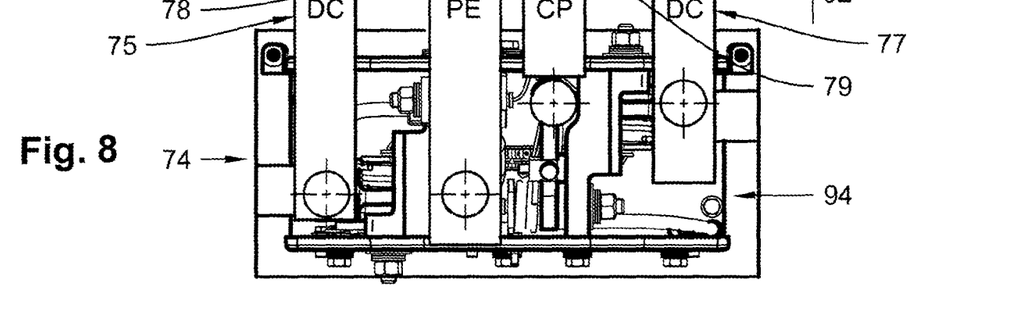
FIG. 8 illustrates a schematic top view of the contact device and the charging contact device of the fast charging system from FIG. 7 in a second contact position.

FIGS. 7 and 8 also illustrate a schematic top view of a contact device 74 and a charging contact device 75 of a fast charging system (not further illustrated). The charging contact device 75 comprises charging contact elements 76, 77, 78 and 79 which each form a charging contact surface 81, 82, 83 and 84, respectively. The contact device 74 comprises a number of contact elements 85 which in turn form contact surfaces 86, 87, 88 and 89. The contact elements 85 are disposed in a plane 90 or in an additional plane 91, said planes 90 and 91 being disposed orthogonally relative to a longitudinal direction (corresponding to a moving direction of a vehicle, indicated by an arrow 92). The charging contact surfaces 80, 81, 82 and 83 are formed at different lengths at a longitudinal end 93 and an opposite longitudinal end 94. In particular, the charging contact surface 83 for forming the protective-ground contact together with the contact surface 88 is longer than the charging contact surfaces 81 and 82 for forming the power contact together with the contact surfaces 86 and 87, respectively, the charging contact surfaces 81 and 82 for forming the power contact each being longer than the charging contact surface 84 for forming the signal contact together with the contact surface 89.

As illustrated in FIGS. 7 and 8, the different lengths of the respective charging contact surfaces 81, 82, 83 and 84 ensure that the charging contact surface 84 is always contacted with the contact surface 89 for forming the signal contact when all other contact pairs have been formed as well. Even if the contact surface 87 is not completely contacted with the charging contact surface 82 (as illustrated in FIG. 7), the charging contact surface 84 is not contacted with the contact surface 89, such that no signal contact is produced via the contact surface 89 and the charging contact surface 84, and that a charging current is applied to the charging contact surfaces 82 and 81. Just as with the longitudinal end 93, this can be ensured for the contact surfaces 89 and 86 at the opposite longitudinal end 94, by means of the difference in length of the charging contact surface 81 and 84. Such a respective physical contact between the charging contact surfaces 81, 82, 83 and 84 and the corresponding contact surfaces 86, 87, 88 and 89, respectively, can be formed or disconnected in a defined order in any case.

The invention claimed is:

1. A fast charging system for electrically driven vehicles, for forming an electrically conductive connection between a vehicle and a stationary charging station, the fast charging system having a contact device, a charging contact device and a positioning device, said contact device or said charging contact device being disposable on a vehicle, said charging contact device being electrically contacted using the contact device when in a contact position, said charging contact device comprising a charging-contact-element carrier having charging contact elements, said charging contact elements each forming a strip-shaped charging contact surface, said contact device comprising a contact element carrier having contact elements, said contact elements each forming a contact surface which are smaller than the charging contact surfaces, said contact elements being electrically contacted with the charging contact elements for forming contact pairs in each instance when in the contact position, said contact device being positioned in a longitudinal direction of the strip-shaped charging contact surfaces and/or a transverse direction of the strip-shaped charging contact surfaces with respect to the charging contact device as well as being moved to the contact position by means of the positioning device, wherein the charging contact surfaces and the contact surfaces are disposed in the longitudinal direction of the charging contact surfaces with respect to each other such that during a relative movement in the longitudinal direction of the charging contact surfaces a respective physical contact between the charging contact surfaces and the contact surfaces is formed in a defined order at respective longitudinal ends of the charging contact surfaces, wherein high currents can be transmitted only when the contact pair of a protective-ground contact and/or a signal contact is formed.

2. The fast charging system according to claim 1, wherein the contact pairs are formed for power contacts, a signal contact and a protective-ground contact of the fast charging system.

3. The fast charging system according to claim 2, wherein the charging contact surfaces and/or the contact surfaces are disposed such in the longitudinal direction with respect to each other that first the protective-ground contact, then the power contacts and then the signal contact are formed.

4. The fast charging system according to claim 2, wherein the longitudinal ends of the charging contact surface for forming the protective-ground contact each protrude beyond the longitudinal ends of the remaining charging contact surfaces in the longitudinal direction.

5. The fast charging system according to claim 2, wherein the longitudinal ends of the charging contact surface for forming the power contact each protrude beyond the longitudinal ends of the charging contact surface for forming the signal contact in the longitudinal direction.

6. The fast charging system according to claim 2, wherein the charging contact surface for forming the protective-ground contact is longer than the charging contact surface for forming the power contact, said charging contact surface for forming the power contact being longer than the charging contact surface for forming the signal contact.

7. The fast charging system according to claim 2, wherein the charging contact surfaces and/or the contact surfaces are disposed in the longitudinal direction with respect to each other that the protective-ground contact and a power contact or the signal contact and a power contact can be formed first.

8. The fast charging system according to claim 1, wherein the charging contact elements are realized as conductor strips, said conductor strips being disposed parallel to each other and in the direction of a longitudinal axis of the charging-contact-element carrier.

9. The fast charging system according to claim 8, wherein the contact elements are disposed in at least one plane which extends orthogonally to the longitudinal axis when in the contact position.

10. The fast charging system according to claim 9, wherein the contact elements are disposed in an additional plane which extends orthogonally to the longitudinal axis when in the contact position, said planes being distanced from each other in the direction of the longitudinal axis, contact elements for forming power contacts being disposed in the plane and the additional plane, respectively.

11. The fast charging system according to claim 1, wherein the contact elements are formed in the shape of bolts.

12. The fast charging system according to claim 1, wherein the contact surface is punctiform.

13. The fast charging system according to claim 1, wherein the contact device and the charging contact device each comprise a vertical axis, said respective vertical axes aligning flush when in the contact position.

14. The fast charging system according to claim 13, wherein a guiding device positions the respective vertical axes in a shared alignment when guiding the contact device and the charging contact device together.

15. The fast charging system according to claim 1, wherein the fast charging system comprises a guiding device for guiding the contact device or the charging contact device to the contact position, the guiding device being realized such that when guiding the contact device and the charging contact device together, a physical contact between the contact elements and the charging contact elements is prevented before the contact position is attained.

16. The fast charging system according to claim 1, wherein the contact device is disposed on a vehicle roof and the charging contact device is disposed on a stationary charging station or vice versa.

17. The fast charging system according to claim 1, wherein the charging-contact-element carrier forms a receiving opening for the contact element carrier, said contact element carrier being inserted into the receiving opening of the charging-contact-element carrier.

18. The fast charging system according to claim 17, wherein the receiving opening forms a guide for the contact element carrier or the charging-contact-element carrier when guiding the contact element carrier and the charging-contact-element carrier together.

19. The fast charging system according to claim 1, wherein the contact element carrier forms a receiving opening for the charging-contact-element carrier, said charging-contact-element carrier being inserted into the receiving opening of the contact element carrier.

20. The fast charging system according to claim 1, wherein the charging-contact-element carrier is formed as a longitudinal roof-shaped rail which is disposed in a moving direction of the vehicle.

21. The fast charging system according to claim 1, wherein the positioning device comprises a pantograph or a rocker by means of which the contact is positioned in a vertical direction with respect to the charging contact device.

22. A method for forming an electrically conductive connection between a vehicle and a stationary charging station for a fast charging system for electrically driven vehicles, the fast charging system having a contact device, a charging contact device and a positioning device, said charging contact device being electrically contacted using the contact device when in a contact position, said contact device being positioned in a longitudinal and/or transverse direction with respect to the charging contact device as well as being moved to the contact position by means of the positioning device, said charging contact elements each forming a strip-shaped charging contact surface, said contact device comprising a contact element carrier having contact elements, said contact elements each forming a contact surface which is smaller than the charging contact surfaces, said contact elements being electrically contacted with the charging contact elements for forming contact pairs in each instance when in the contact position, said contact device being positioned in a longitudinal direction of the strip-shaped charging contact surfaces and/or a transverse direction of the strip-shaped charging contact surfaces with respect to the charging contact device as well as being moved to the contact position by means of the positioning device, wherein at least one charging contact surface is contacted with a contact surface at a longitudinal end of the charging contact surface, said charging contact surfaces and the contact surfaces being disposed such in the longitudinal direction of the charging contact surfaces with respect to each other that when guiding the charging contact surfaces and the contact surfaces together in the longitudinal direction of the charging contact surfaces, first the protective-ground contact, then the power contacts and then the signal contact is formed, wherein high currents are transmitted only when the contact pair of the protective-ground contact and/or the signal contact is formed.

23. The method according to claim 22, wherein when the charging contact surfaces and the contact surfaces are separated, first the signal contact, then the power contact and then the protective-ground contact are disconnected.

24. The method according to claim 22, wherein the charging contact surfaces and the contact surfaces are disposed in the longitudinal direction with respect to each other such that a respective physical contact between the charging contact surfaces and the contact surfaces is formed in a defined order at respective longitudinal ends of the charging contact surfaces.

* * * * *

UNITED STATES PATENT AND TRADEMARK OFFICE
CERTIFICATE OF CORRECTION

PATENT NO. : 11,584,244 B2
APPLICATION NO. : 16/980768
DATED : February 21, 2023
INVENTOR(S) : Nils Heieis et al.

It is certified that error appears in the above-identified patent and that said Letters Patent is hereby corrected as shown below:

In the Specification

Column 3, Line 55, "are to necessary" should be --are necessary--.

Column 4, Line 24, "and/or to the" should be --and/or the--.

Column 9, Line 10, "19, to the" should be --19, the--.

Column 10, Line 21, "64, to are" should be --64, are--.

Signed and Sealed this
Sixteenth Day of May, 2023

Katherine Kelly Vidal
*Director of the United States Patent and Trademark Office*